United States Patent
Halin

(10) Patent No.: US 7,040,578 B2
(45) Date of Patent: May 9, 2006

(54) LOCKING THE COWL DOORS OF A TURBOJET

(75) Inventor: Yves Halin, Toulouse (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/882,206

(22) Filed: Jul. 2, 2004

(65) Prior Publication Data

US 2005/0045767 A1    Mar. 3, 2005

(30) Foreign Application Priority Data

Jul. 4, 2003    (FR)    ................................. 03 08155

(51) Int. Cl.
*B64C 7/02* (2006.01)

(52) U.S. Cl. ................................. 244/129.4

(58) Field of Classification Search ............ 244/53 R, 244/129.1, 129.4, 129.5; 292/11, 56, 119

See application file for complete search history.

(56) References Cited

U.S. PATENT DOCUMENTS

| 1,907,430 | A | * | 5/1933 | Mears et al. ................ 384/154 |
| 2,550,337 | A | * | 4/1951 | Duffendack, Jr. et al. . 123/41.7 |
| 2,783,072 | A | * | 2/1957 | Sessler ........................ 292/256 |
| 3,145,021 | A | * | 8/1964 | Anderson ..................... 49/246 |
| 4,549,708 | A | * | 10/1985 | Norris ....................... 244/129.4 |
| 4,629,146 | A | * | 12/1986 | Lymons ..................... 244/53 R |
| 6,824,175 | B1 |  | 11/2004 | Porte |

FOREIGN PATENT DOCUMENTS

| BE | 473228 | 5/1947 |
| EP | 1 091 059 | 4/2001 |
| EP | 1 197 619 | 4/2002 |
| EP | 1 314 839 | 5/2003 |

* cited by examiner

*Primary Examiner*—Galen Barefoot
(74) *Attorney, Agent, or Firm*—Oblon, Spivak, McClelland, Maier & Neustadt, P.C.

(57) ABSTRACT

Turbojet cowl doors have bottom longitudinal edges fitted with hooking means and with locking means which comprise catches fixed on a rotary drive shaft carried by one of the doors and which co-operate with hooking members hinged about an axis on the other one of the doors.

19 Claims, 6 Drawing Sheets

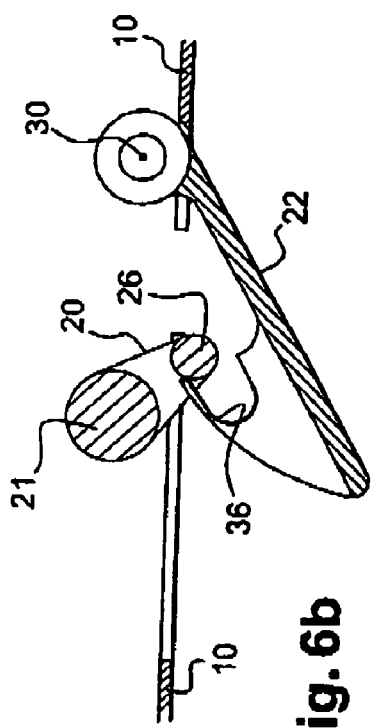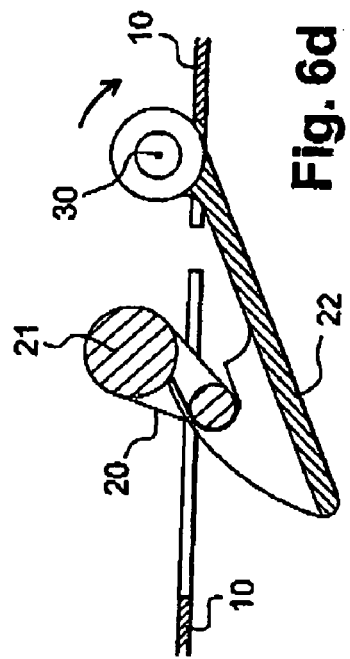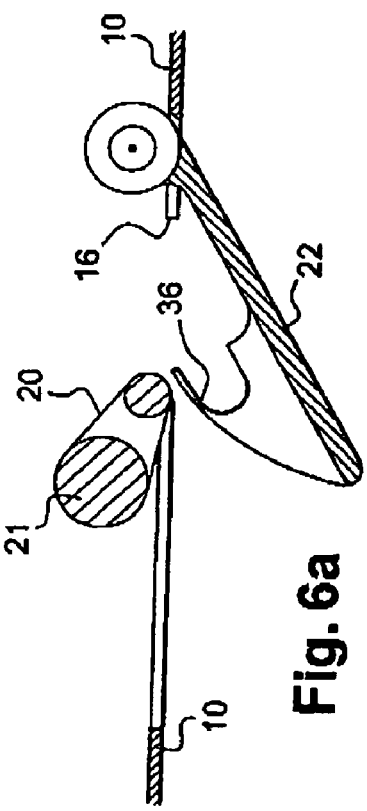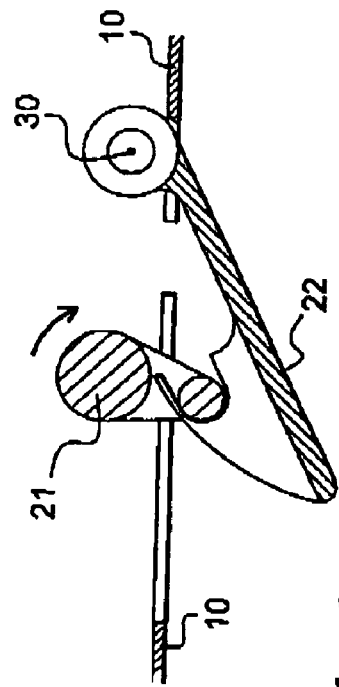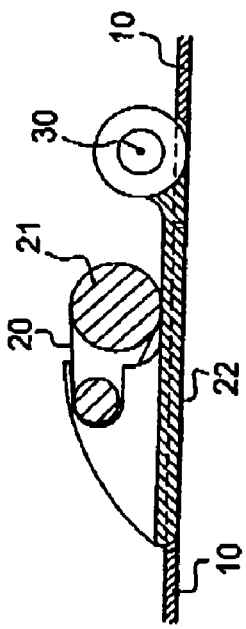

LOCKING THE COWL DOORS OF A TURBOJET

BACKGROUND OF THE INVENTION

Cowl doors are panels of semicylindrical shape having top longitudinal edges hinged about longitudinal axes and having bottom longitudinal edges fitted with locking means that enable them to be fastened to each other in a position where they are close together or docked.

The locking means are formed by locks distributed along the bottom longitudinal edges of the doors, these locks comprising hooking levers carried by one of the doors and operated by hand independently of one another to engage on hooking fingers mounted on the other one of the doors.

It has been found that cowl doors that have been opened for maintenance purposes are sometimes subsequently poorly reclosed, with some of the locks being forgotten or incompletely locked, and that can lead subsequently to the doors opening in flight and being torn off.

Proposals have already been made for locking apparatuses that seek to reduce this risk, relying on signaling means that are associated with the locks and that are mounted so as to be clearly visible in order to attract attention when the locks are unlocked or badly locked.

Known means of that type have nevertheless turned out to be relatively ineffective or else they are relatively complex and bulky, heavy and expensive.

OBJECTS AND SUMMARY OF THE INVENTION

A particular object of the invention is to provide a solution to the problem of making the locking of such doors safe in a manner that is simple, effective, and inexpensive.

To this end, the invention provides turbojet cowl doors, each door having a top longitudinal edge hinged about a longitudinal axis and a bottom longitudinal edge for fastening by means of locking apparatus to a bottom longitudinal edge of the other door, the apparatus comprising locking members mounted on the bottom longitudinal edge of a first door and co-operating with hooking members mounted on the bottom longitudinal edge of a second door, wherein the locking members are catches each of which is fixed to a rotary drive shaft parallel to the hinge axis of the first door and is movable between a locking angular position and an unlocking angular position, and wherein each hooking member is mounted on the bottom longitudinal edge of the second door to pivot about an axis parallel to the hinge axis of the second door and comprises means for hooking onto a corresponding catch in order to be moved by said catch between a locking angular position and an unlocking angular position.

Mounting the catches and the hooking members to turn on parallel axes enables locking to be performed in a manner that is very simple and very effective while also reducing the amount of space occupied inside the doors, the catches and the hooking members pivoting outwards from the doors on being unlocked. By pivoting outwards they are made clearly visible, which makes it easy to see whether or not the doors are locked.

According to another characteristic of the invention, the catches are secured to a common rotary drive shaft and are movable simultaneously between their locking angular positions and their unlocking angular positions.

This makes the doors much easier to lock and avoids any risk of forgetting to actuate one of the locking means, since the locking means are locked or unlocked simultaneously.

According to another characteristic of the invention, the hooking members are independent from one another, each being associated with a return spring urging it towards the unlocking position.

By means of this disposition, a hooking member is automatically returned or held in a visible unlocking position if the corresponding catch, for any reason whatsoever, fails to entrain it or fails to hold it in the locking position.

In a particular embodiment of the invention, each hooking member is formed by a tab which is pivotally mounted at one end on the above-mentioned hinge axis and which includes at its opposite end a U-shaped notch whose opening faces towards the hinge axis and is designed to receive a portion of the corresponding catch.

This portion of the lock is formed by a cylindrical finger which is parallel to the catch drive shaft and which is connected to said shaft by one or two tabs that are perpendicular to the shaft and to said finger.

This embodiment of the invention is particularly simple and very reliable.

In addition, the catches hooked onto the hooking members in their unlocking position form means for moving the bottom longitudinal edges of the doors towards each other while they are being driven towards their locking position.

The actions of closing and of locking the doors thus become particularly simple and reliable, locking being ensured in the invention regardless of whether the doors are already positioned edge to edge or whether they are still slightly apart from each other.

According to another characteristic of the invention, the locking position of the catches lies beyond a position of unstable equilibrium in which the catches are in alignment with the hinge axis of the hooking members. In this position of unstable equilibrium, the catches bear axially against the hooking means of the hooking members.

This bearing force advantageously constitutes a hard point through which it is necessary to pass in order to bring the catches into their locking position, thereby naturally ensuring that the catches are held in this position.

This improves locking safety.

In a preferred embodiment of the invention, the catches are movable between their locking and unlocking positions by means of a handle connected to their rotary drive shaft, and the handle forms a lever for multiplying force.

To do this, the handle can be hinged to the first door about an axis parallel to the axis of the catch drive shaft and can include a rectilinear slot in which there is received an off-center finger carried by the drive shaft.

This embodiment enables locking force to be multiplied and also makes it possible to obtain a movement stroke for the catches over a large angle between their locking and unlocking positions, said stroke being, for example, 160° to 180° approximately when the corresponding angular displacement stroke of the handle is only about 90°.

BRIEF DESCRIPTION OF THE DRAWINGS

The invention will be better understood and other characteristics, details, and advantages thereof will appear more clearly on reading the following description made by way of example with reference to the accompanying drawings, in which:

FIGS. 6a to 6e are diagrams showing five stages in an operation of docking and simultaneously locking the doors;

MORE DETAILED DESCRIPTION

Figure 1:
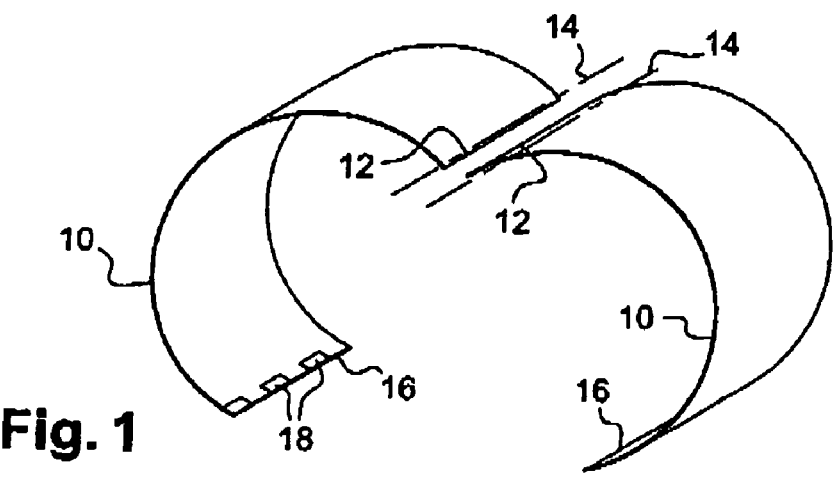
FIG. 1 is a diagrammatic perspective view of two turbojet cowl doors.
Figure 2:
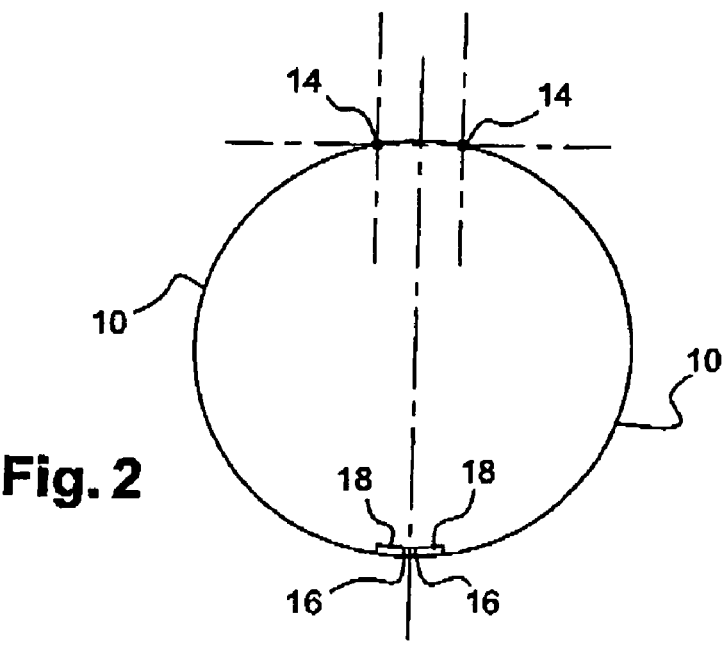
FIG. 2 is a front view showing the two doors in the closed position.

Reference is made initially to FIGS. 1 and 2 which are diagrams showing two turbojet cowl doors of conventional type, these doors being formed by two panels 10 that are substantially semicylindrical in shape, having respective top longitudinal edges 12 that are hinged about parallel longitudinal axes 14 by hinges or the like, and having respective bottom longitudinal edges 16 that are fitted with locking means 18 enabling them to be fastened securely together when the two doors 10 are in the closed position with their bottom longitudinal edges 16 being forced one against the other, as shown in FIG. 2.

Figure 3:
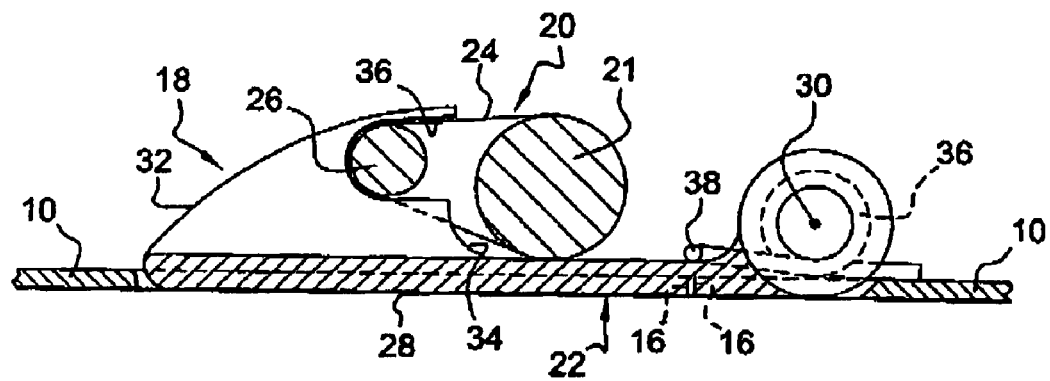
FIG. 3 is a diagram showing a lock of the invention.

An example of locking means 18 of the invention is shown in FIG. 3.

These locking means comprise firstly a catch 20 mounted on the bottom longitudinal edge 16 of a first door 10, the left-hand door in FIG. 3, and secondly a hooking member 22 mounted on the longitudinal edge 16 of the second door 10, the door on the right in FIG. 3.

Figure 4A:
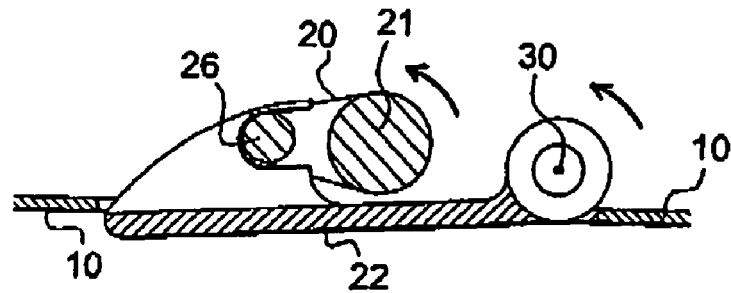
FIGS. 4a to 4d are diagrams showing four stages in an operation of unlocking the doors.
Figure 4B:
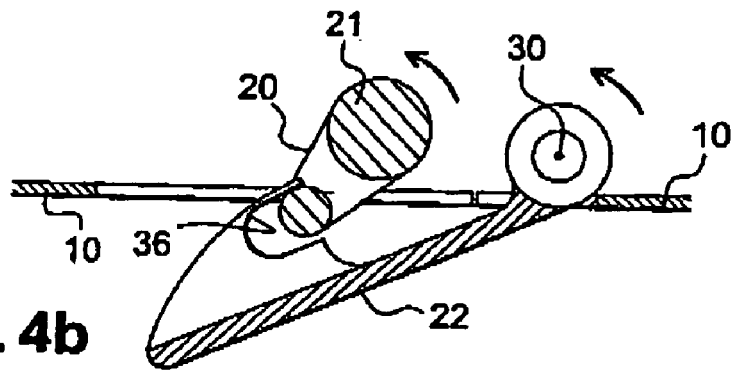
Figure 4C:
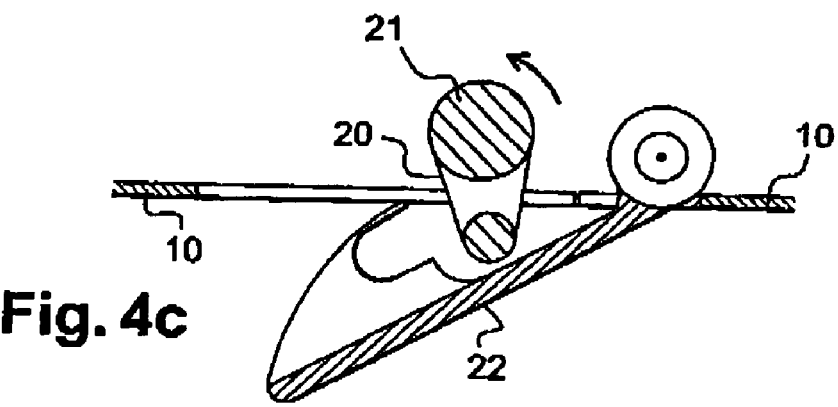
Figure 4D:
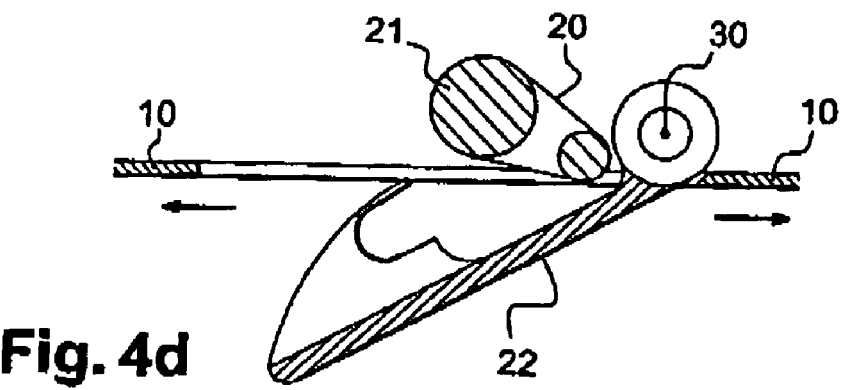
Figure 5A:
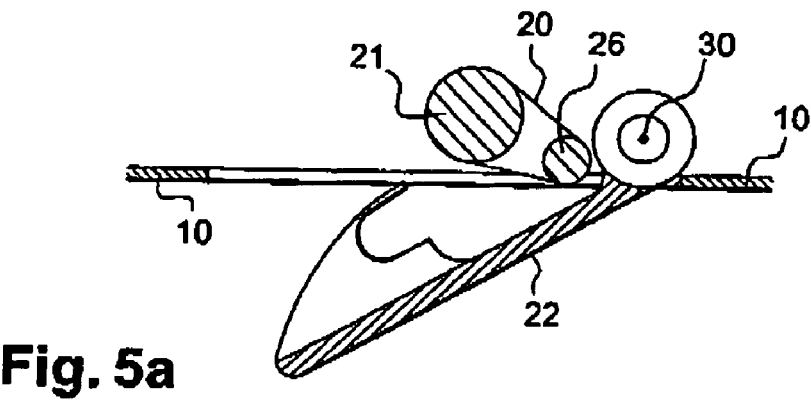
FIGS. 5a, 5b, and 5c show three stages in an operation of locking the doors.

The catch 20 is constrained to turn with a longitudinal cylindrical rod 21 which is carried by the first door 10 and which extends parallel to the hinge axes 14 of the door, said rod 21 forming a shaft for turning the catch 20 between a locking position shown in FIG. 3 and a fully unlocking position shown in FIGS. 4d and 5a, for example.

In this embodiment, the catch 20 comprises two fork-forming parallel arms 24 each having one end secured to the shaft 21 and connected together via their opposite ends by a cylindrical finger 26 extending parallel to the shaft 21.

The hooking member 22 mounted on the bottom longitudinal edge 16 of the second door 10 comprises a tab 28 having one end mounted to turn freely on the second door 10 about an axis 30 parallel to the shaft 21, and having an opposite end carrying means for hooking onto the cylindrical finger 26 of the catch 20.

In this embodiment, the hooking means are formed by a hook 32 which projects from the tab 28 towards the inside of the door 10 when in the locked position as shown in FIG. 3, and defining a U-shaped notch 36 for receiving the cylindrical finger 26 of the catch 20, the open end of the notch 36 facing towards the hinge pin 30.

Beside the free end of the hooking member 22, the hook 32 is of a convex rounded shape, whereas the open end of the notch 36 is connected to the tab 28 via a concave rounded surface 34.

In addition, a return spring 38 is associated with the hooking member 22 and is formed, for example, by a spiral spring wound around the axis 30 and having one end prevented from rotating, its other end being mounted on the hooking member 22 tending to pivot it towards its unlocking position as shown in FIGS. 4d and 5a, for example.

The locking apparatus of the invention comprises a plurality of catches 20 and hooking members 22 of the type described above, which are distributed along the bottom longitudinal edges 16 of the doors 10, there being four of them, for example. The catches 20 are advantageously mounted on the same drive shaft 21, while the hooking members 22 are independent from one another and free to turn about the axis 30.

The catch drive shaft 21 is itself driven by any suitable means, for example a handle of the type shown in FIG. 8 and described below.

The operation of the apparatus of the invention is described below with reference to FIGS. 4a to 4d, 5a to 5c, 6a to 6e, and 7a to 7e.

FIGS. 4a to 4d show four stages in unlocking the doors, the first stage shown in FIG. 4a comprising turning the shaft 21 in the direction indicated by the arrow away from the fully locked position as shown in FIG. 3. Turning the catch 20 leads to corresponding turning of the hooking member 22 which turns about the axis 30 in the direction indicated by the arrow until the cylindrical finger 26 of the catch separates from the notch 36 as shown in FIG. 4b.

Thereafter, the shaft 21 continues to turn in the same direction as shown in FIG. 4c, but the hooking member 22 is no longer entrained by the catch and remains in the position shown in FIG. 4c, which is its unlocking position in which it projects from the doors 10 and is clearly visible. The return spring 38 of this locking member 22 holds it in this position.

In FIG. 4d, the catch 20 is in its fully unlocked position, the hooking member 22 remaining in the above-mentioned unlocking position. The doors 10 can then be opened by being moved apart from each other as represented by arrows in FIG. 4d.

The angular movement of the catch 20 between its locking and fully unlocking positions is about 170° in this example, while the angular movement of the hooking member 22 is about 45°.

Figure 5B:
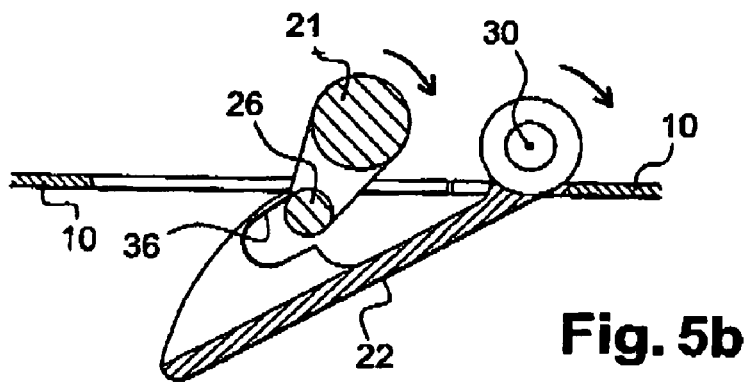
Figure 5C:
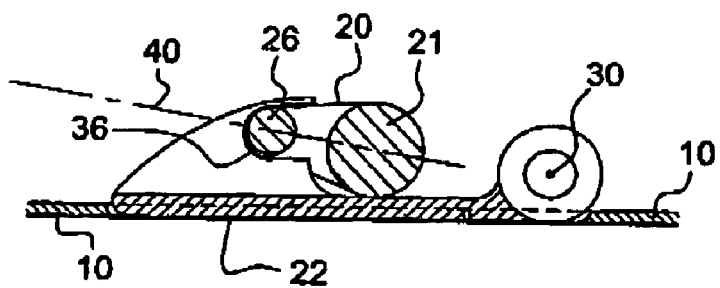

A first way of locking the doors is shown in FIGS. 5a, 5b, and 5c.

In a first stage, the bottom edges of the two doors are moved towards each other until they are substantially touching, as shown in FIG. 5a.

The hooking member 22 is held by its return spring in the unlocking position as shown, while the catch 20 is in its fully unlocking position in which its cylindrical finger 26 is in the vicinity of the end of the hooking member 22 hinged on the axis 30.

The second stage of locking shown in FIG. 5b comprises turning the shaft 21 in the direction shown by the arrow, this brings the cylindrical finger 26 of the catch 20 into the open end of the U-shaped notch 36 in the hooking member. As the catch 20 continuous to turn in the direction shown, the cylindrical finger 26 of the catch comes to bear against the end edge of the notch 36 and causes the hooking member 22 to pivot towards its locking position.

Complete locking is shown in FIG. 5c, where it can be seen that the hooking member 22 has returned into alignment with the bottom longitudinal edges 16 of the doors 10 and no longer projects outside the doors. The cylindrical finger 26 of the catch 20 lies a little beyond a position of unstable equilibrium in which its axis is in the plane containing the axis of the shaft 21 and the axis 30. In this position of unstable equilibrium, the cylindrical finger 26 presses against the bottom of the notch 36 and this can correspond to a hard point that helps keep the catch 20 and the hooking member 22 in their fully locked positions.

Proper locking of all of the locking means 18 fitted to the doors 10 can be checked in a glance, since none of the catches 20 and none of the hooking members 22 should be projecting from the doors.

FIGS. 6a to 6e show a locking operation that takes place when the bottom longitudinal edges 16 of the doors 10 are still a little way apart from each other, as shown in FIG. 6a.

The longitudinal edges of the two doors 10 are initially approached a little as shown in FIG. 6b until the cylindrical fingers 26 of the catches 20 come level with the open ends of the notches 36 in the hooking members 22 which are held in their unlocking position by their return springs 38.

The shaft 21 then turns the catches 20 to engage the cylindrical fingers 26 in the notches 36 of the hooking members 22, as shown in FIG. 6c, and this turning is continued so as to cause the hooking members 22 to pivot towards their locking positions, as shown in FIGS. 6d and 6e.

Turning the shaft 21 from the position shown in FIG. 6c to the position shown in FIG. 6e has the effect of simultaneously moving the bottom longitudinal edges 16 of the doors 10 towards each other until they are substantially touching.

Figure 7A:
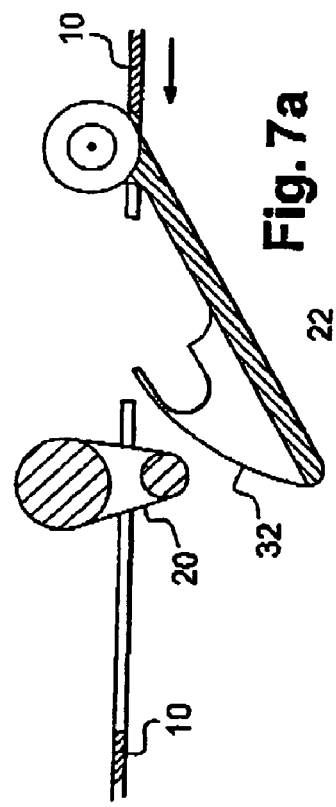
FIGS. 7a to 7e are diagrams showing five stages in an operation of docking and simultaneous locking the doors when the catches are in the extended position.
Figure 7B:
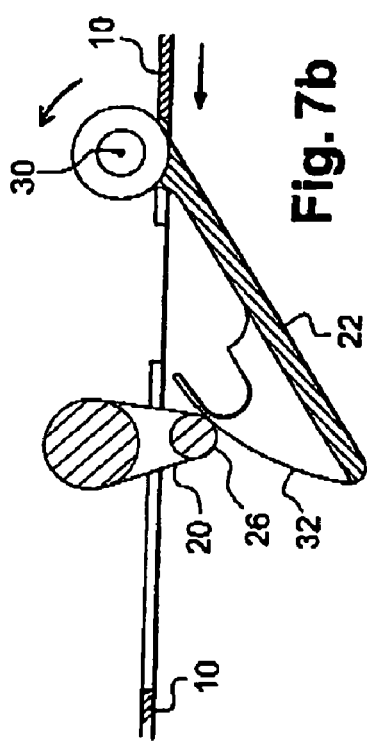
Figure 7C:
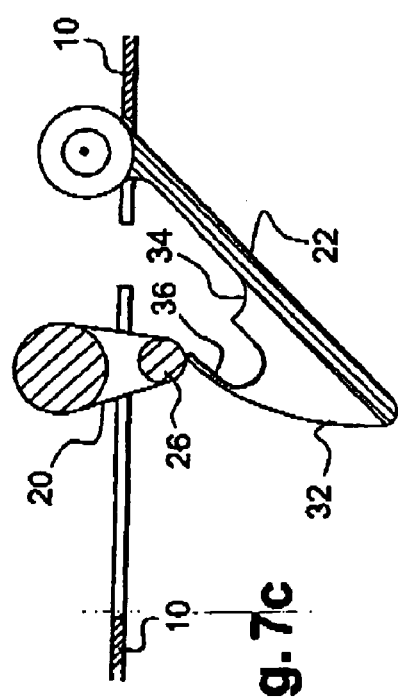
Figure 7D:
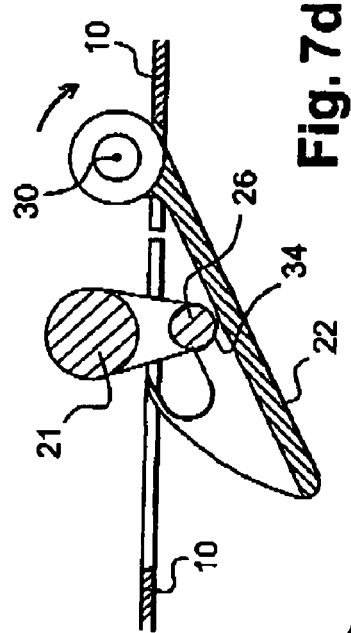

Another way of locking is shown in FIGS. 7a to 7e, for the case when the catches 20 are in an intermediate position between their fully unlocking position and their locking position, and in which they project out from the doors 10 on which they are mounted. In this case, when the bottom longitudinal edges of the doors 10 are moved towards each other as shown in FIG. 7a, with the hooking members 22 being held in their unlocking position by their return springs 38, the cylindrical fingers 26 of the catches 20 will come into abutment against the convex outside surfaces of the hooks 32 of the hooking members 22, thereby causing them to pivot outwards away from the doors, as shown in FIGS. 7b and 7c until the fingers move past the ends of the hooks 32 of the hooking members 22 and come substantially up to the concave curved surfaces 34 of these hooking members, as shown in FIG. 7d.

Figure 7E:
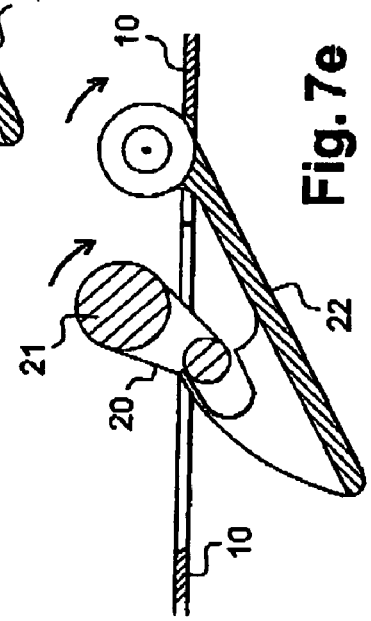

Thereafter, the shaft 21 carrying the catches 20 is turned in the direction shown by the arrow in FIG. 7e until full locking is achieved.

Figure 8:
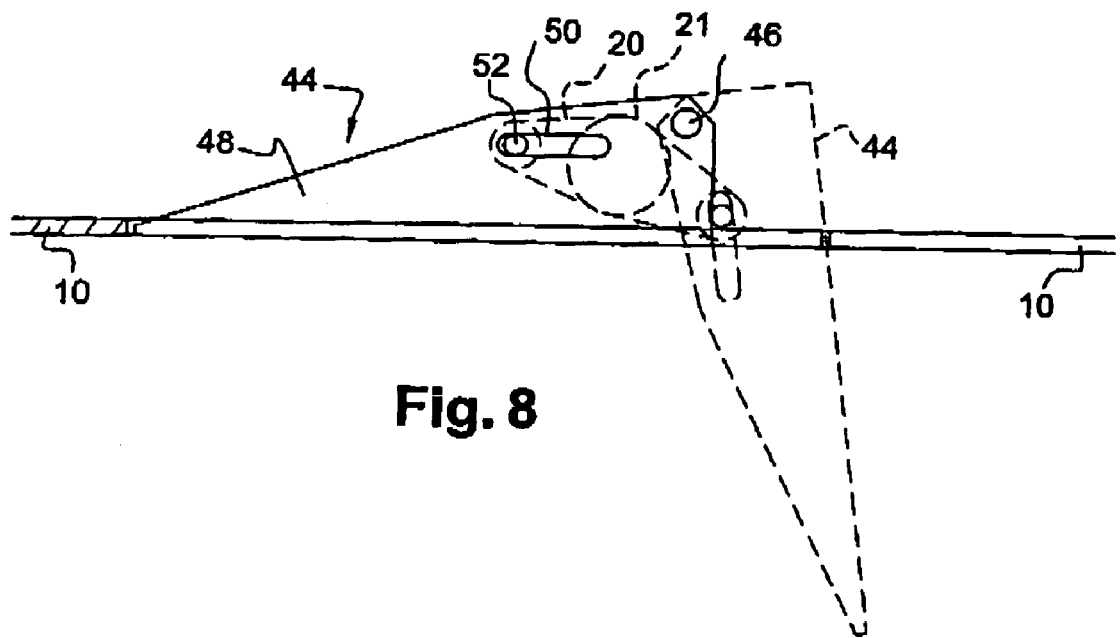
FIG. 8 is a diagram showing a handle of the locking device of the invention.

In a preferred embodiment of the invention, the shaft 21 carrying the catches 20 is turned by means of a handle 44 which is shown in continuous lines in FIG. 8 in is locking position and in dashed lines in its unlocking position.

The handle 44 forms a compound lever and is hinged to the first door 10 on which the shaft 21 is mounted for turning the catches, about an axis 46 that is parallel to the shaft 21. The handle 44 is formed by a U-shaped plate or by an I-shaped plate having one wall 48 perpendicular to the axis 46 and including a slot 50 in which there is engaged a finger 52 that is parallel to the shaft 21 and that is off-center relative thereto, the finger 52 being carried by the shaft 21.

By way of example, the finger 52 is formed by an extension of a cylindrical finger 26 of a catch 20.

When the handle 44 is in the locking position shown in continuous lines in FIG. 8, it extends the bottom longitudinal edges 16 of the door panels 10 and is not visible. In order to unlock the door panels, the handle 44 is turned about its hinge axis 46 so as to bring it into the position shown in dashed lines, with the angular movement of the door between its locking and unlocking positions being slightly greater than 90° in this example. This turning of the handle leads to corresponding turning of the finger 52 about the axis 46 and to said finger being moved along a major fraction of the slot 50, and causes the catches 20 and their shaft 21 to turn about the axis of the shaft 21 through about 170°.

The length of the handle relative to its hinge axis 46 is several times greater than that of the catches 20 so that the handle acts as a force multiplier while also multiplying the angular travel of the catches 20 about the axis of the shaft 21. This shaft is guided to turn in smooth bearings of conventional type carried by the first door 10.

The handle 44 may be mounted at one end of the shaft 21 or on an intermediate portion thereof.

Figure 9:
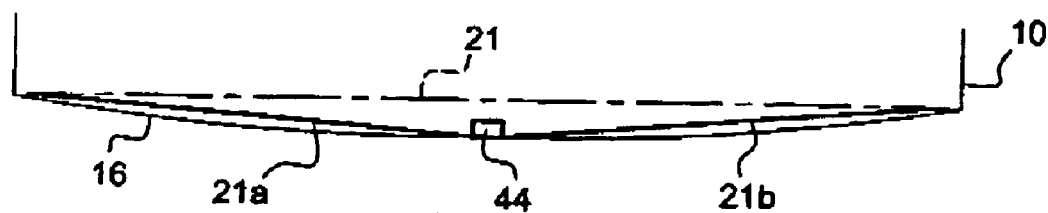
FIG. 9 is a diagram showing a particular way of mounting the handle.

When the bottom longitudinal edges 16 of the doors 10 are of a curved longitudinal shape as shown diagrammatically in FIG. 9, it is preferable for the shaft 21 to be made up of two shaft segments 21a and 21b placed end to end and forming chords between the ends of the edges 16 and their middle, the handle 44 then being placed at the junction between 21a and 21b.

This avoids using a single rectilinear shaft 21 which would extend over the entire length of the bottom longitudinal edge 16 of the door, as represented by a chain-dotted line, since that would occupy too much space inside the doors, which would be troublesome.

What is claimed is:

1. Turbojet cowl doors, each door having a top longitudinal edge hinged about a longitudinal axis and a bottom longitudinal edge comprising locking means for fastening to a bottom longitudinal edge of the other door, the locking means comprising locking members pivoted on the bottom longitudinal edge of a first door and co-operating with hooking members mounted on the bottom longitudinal edge of a second door, wherein the locking members are catches each of which is fixed to a rotary drive shaft parallel to the hinge axis of the first door and is movable between a locking angular position and an unlocking angular position, and wherein the hooking members are tabs each of which is mounted on the bottom longitudinal edge of the second door to pivot about a pivot axis parallel to the hinge axis of the second door and comprises a U-shaped notch whose opening faces towards said pivot axis and is designed to receive a portion of a corresponding catch in order to be moved by said catch between a locking angular position and an unlocking angular position.

2. Cowl doors according to claim 1, wherein the catches are carried on a common rotary drive shaft and are movable simultaneously between their locking angular positions and their unlocking angular positions.

3. Cowl doors according to claim 1, wherein the hooking members are independent from one another, each being associated with a return spring urging it towards the unlocking position.

4. Cowl doors according to claim 1, wherein the hooking members project outside the second door when in their unlocking position.

5. Cowl doors according to claim 1, wherein the hooking members are in alignment with the longitudinal edges of the doors when in their locking position.

6. Cowl doors according to claim 1, wherein said portion of the catch is a cylindrical finger which is parallel to the catch drive shaft and which is connected to said shaft by one or two tabs perpendicular to the shaft and to the finger.

7. Cowl doors according to claim 1, wherein the catches hooked onto the hooking members in their unlocking position form means for moving the bottom longitudinal edges of the doors towards each other while they are being driven towards their locking position.

8. Cowl doors according to claim 1, wherein the locking position of each catch lies beyond a position of unstable equilibrium in which the catch is in alignment with the axis of the drive shaft and with the pivot axis of the corresponding hooking member.

9. Cowl doors according to claim 8, wherein, in said position of unstable equilibrium, the catch bears axially against the bottom of the U-shaped notch of the hooking member.

10. Cowl doors according to claim 2, wherein the catches are movable between their locking and unlocking positions by means of a handle connected to their rotary drive shaft.

11. Cowl doors according to claim 10, wherein the handle forms a force multiplying lever.

12. Cowl doors according to claim 10, wherein the handle is hinged to the first door about an axis parallel to the axis of the catch drive shaft and includes a rectilinear slot in which there is engaged a finger carried by the drive shaft and off-center relative thereto.

13. Turbojet cowl doors comprising:
 a first door having a first edge;
 a catch disposed on said first edge;
 a second door having a second edge;
 a hooking member disposed on said second edge and pivotable about a pivot axis, said hooking member having a U-shaped notch with an opening facing said pivot axis;
 wherein in a first position, said hooking member and said catch are positioned such that said catch is received in said U-shaped notch of said hooking member, and
 wherein said hooking member is pivotable about said pivot axis to move from said first position to a second position, wherein in said second position, said catch is not in said U-shaped notch.

14. Cowl doors according to claim 13, wherein in said first position, said first edge is locked against said second edge.

15. Cowl doors according to claim 14, wherein in said second position, said first edge is not locked against said second edge.

16. Cowl doors according to claim 13, wherein said first door has a top longitudinal edge hinged about a first longitudinal axis.

17. Cowl doors according to claim 16, wherein said catch is coupled to a rotary drive shaft parallel to said first longitudinal axis.

18. Cowl doors according to claim 16, wherein said second door has a top longitudinal edge hinged about a second longitudinal axis.

19. Cowl doors according to claim 18, wherein said pivot axis is parallel to said second longitudinal axis.

* * * * *